(No Model.)

C. H. FOWLER.
SPEED INDICATOR.

No. 282,067.

Patented July 31, 1883.

WITNESSES
Joseph Ishbaugh.
B. W. Williams

INVENTOR,
Charles H. Fowler.
By his atty,
Henry W. Williams

UNITED STATES PATENT OFFICE.

CHARLES H. FOWLER, OF BOSTON, MASSACHUSETTS.

SPEED-INDICATOR.

SPECIFICATION forming part of Letters Patent No. 282,067, dated July 31, 1883.

Application filed January 20, 1883. (No model.)

*To all whom it may concern:*

Be it known that I, CHARLES H. FOWLER, of Boston, in the county of Suffolk and State of Massachusetts, have invented a new and useful Improvement in Speed-Indicators, of which the following is a specification.

This indicator is for the purpose of indicating rotary speed.

Figure 1:
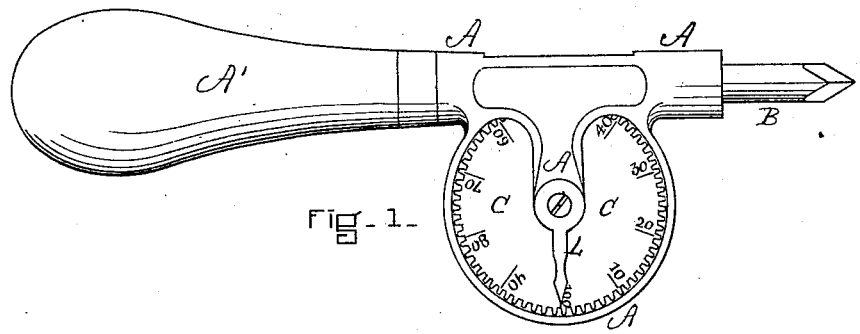
Figure 3:
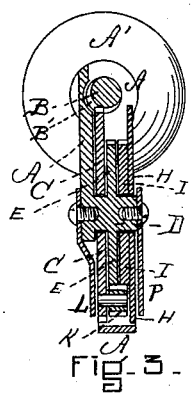
Figure 2:
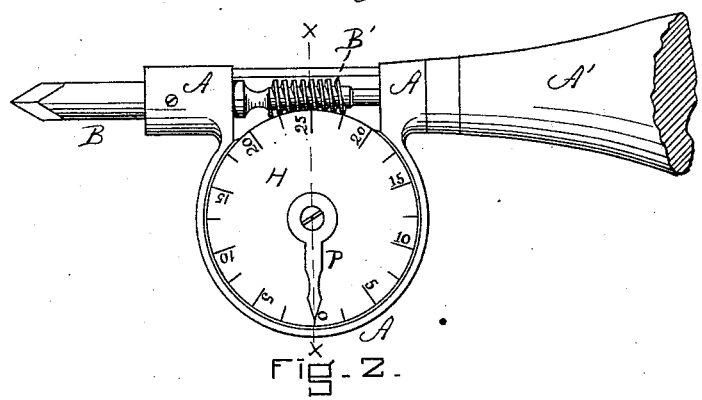
Figure 4:
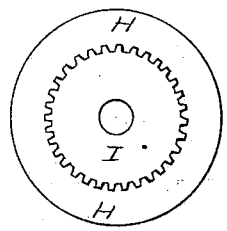
Figure 5:
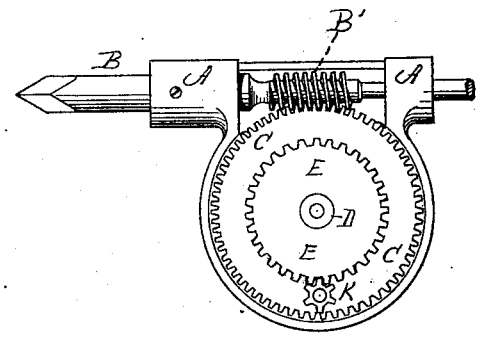

In the accompanying drawings, in which similar letters of reference indicate like parts, Figure 1 is a front elevation of my improved speed-indicator. Fig. 2 is a rear elevation of the same. Fig. 3 is a vertical section on line $x$, Fig. 2. Fig. 4 is a rear elevation of the "hundredths-dial." Fig. 5 is an interior elevation with the hundredths-dial removed, showing a rear view of the "units-dial" and gear attached thereto.

A is a frame, to which is fixed the handle A'. Free to rotate in this frame is a shaft, B, having its outer end pointed and squared, so as to fit into the center of a shaft or pulley, and provided with the worm B'.

C is the units-dial. This dial has one hundred teeth (in practice) on its periphery, meshes in the worm B', and moves on the axle or shaft D the distance from one tooth to the next one-hundredth of a rotation with each complete rotation of the shaft B. For the sake of convenience the teeth are numbered. The axle D is rigidly fixed to or integral with the frame A, and rigidly fixed to the axle D is the gear-wheel E, having fifty teeth. Loosely placed upon the axle D is the hundredths-dial H, to the rear side of which is rigidly secured the gear-wheel I, having forty-nine teeth. The pinion K engages in the wheels E and I, having fifty and forty-nine teeth, respectively, thus producing a differential gear. The dial has a graduation on its face of fifty spaces, and is numbered from 0 to 25, commencing at the bottom and extending both ways. A pointer, L, extends from the frame A over the dial C, and a pointer, P, extends from the axle D over the dial H, the axle projecting slightly beyond the surface of the dial, in order to prevent it from interfering with the pointer P. The pointers do not rotate, but are fixtures.

It will thus be seen that each rotation of the shaft B produces one-hundredth of a rotation of the dial C. One hundred rotations of the shaft B produce one complete rotation of the dial C and one forty-ninth of a rotation of the dial H. Twenty-five hundred rotations of the shaft B produce twenty-five rotations of the dial C.

The dial H being numbered as above described, provided the pointer P indicates 0, the shaft B may be turned in either direction and its rotations indicated.

It is, of course, understood that a note must be taken of the time occupied, in order that the speed may be ascertained.

Having thus fully described my invention, what I claim, and desire to secure by Letters Patent, is—

The herein-described improved speed-indicator, consisting, essentially, of the following parts, viz: the frame A, shaft B, provided with the worm B', gear-wheel and dial C, differential gear E I K, dial H, hub or axle D, and fixed pointers L P, said dials C H being arranged on opposite sides of the indicator, and all arranged and constructed substantially as set forth, and for the purpose described.

CHARLES H. FOWLER.

Witnesses:
HENRY W. WILLIAMS,
JOSEPH ISHBAUGH.